(12) United States Patent
Brault et al.

(10) Patent No.: US 8,133,020 B2
(45) Date of Patent: Mar. 13, 2012

(54) FASTENER DEVICE FOR FASTENING A FREE TURBINE STATOR WITH DUAL CENTERING

(75) Inventors: Michel Gilbert Roland Brault, Quincy Sous Senart (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 1118 days.

(21) Appl. No.: 11/940,795

(22) Filed: Nov. 15, 2007

(65) Prior Publication Data

US 2008/0112805 A1    May 15, 2008

(30) Foreign Application Priority Data

Nov. 15, 2006 (FR) ...................... 06 54916

(51) Int. Cl.
F01D 25/28 (2006.01)
(52) U.S. Cl. ..................... 415/213.1; 415/232
(58) Field of Classification Search ............... 415/213.1, 415/142, 232
See application file for complete search history.

(56) References Cited

U.S. PATENT DOCUMENTS

| | | | | |
|---|---|---|---|---|
| 3,620,009 A | * | 11/1971 | Wilde ............................ | 60/791 |
| 3,620,641 A | * | 11/1971 | Keen et al. .................... | 415/229 |
| 7,260,892 B2 | * | 8/2007 | Schilling et al. ........... | 415/213.1 |

FOREIGN PATENT DOCUMENTS

| | | |
|---|---|---|
| EP | 1 340 902 A2 | 9/2003 |
| EP | 1 387 060 A2 | 2/2004 |
| EP | 1 394 385 A1 | 3/2004 |
| EP | 1 626 002 A1 | 2/2006 |
| EP | 1 655 457 A1 | 5/2006 |
| EP | 1 655 475 A1 | 5/2006 |

OTHER PUBLICATIONS

U.S. Appl. No. 12/052,108, filed Mar. 20, 2008, Brault, et al.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

The invention relates to the field of free turbines mounted on a gas turbine engine. It provides a fastener device for fastening a free turbine stator on a gas generator casing that shares a common axis with the turbine stator, the fastener device comprising a flange carrying a plurality of assembly parts providing a first releasable connection between the turbine stator and the gas generator casing, the flange providing first centering of the turbine stator on the casing. The fastener device further comprises a second releasable connection between the turbine stator and the gas generator casing that is axially offset from the flange towards the gas generator and that provides second centering of the turbine stator on the casing.

14 Claims, 2 Drawing Sheets

FASTENER DEVICE FOR FASTENING A FREE TURBINE STATOR WITH DUAL CENTERING

BACKGROUND OF THE INVENTION

The invention relates more particularly to a fastener device for fastening a free turbine stator on a gas generator casing that shares a common axis with the turbine stator, the fastener device comprising a flange carrying a plurality of assembly parts (e.g. bolts) providing a first releasable connection between the turbine stator and the gas generator casing, the flange providing first centering of the turbine stator on the gas generator casing.

In certain aeroengine systems, e.g. an unducted fan (UDF) engine having two contrarotating propellers, the stator of the turbine carrying the propeller(s) is fastened on the structural casing of the gas generator. The turbine stator thus shares a common axis with the generator casing. It is preferable for the engine system to be a modular assembly, i.e. for the turbine stator to be removable so that it can be separated from and reassembled with the gas generator casing. The turbine can thus be separated from the gas generator for maintenance purposes, without it being necessary to disassemble the gas generator from the airplane, an operation that is burdensome and expensive. This makes it easier to maintain the free turbine.

The connection between the turbine stator and the generator casing is provided for example by means of an annular flange carrying a ring of bolts clamping the stator against the casing and holding it axially thereto. The flange is situated at one end of the stator. The flange is centered on the casing by its ring of bolts, and with the help of centering that is short, i.e. the flange is axially aligned with the casing with the additional help of the flange possessing a cylindrical annular outer surface that is slidably received in a cylindrical annular inner surface of the casing, the two cylindrical surfaces having the same radius about the common axis. The flange is thus engaged in the casing over a mutual engagement length that is equal to the size of said inner cylindrical surface of the casing along the common axis of the casing and the stator.

Nevertheless, for reasons of available space, convenience in assembly, and weight, the radius of the flange and the mutual engagement length are both limited. Unfortunately, the center of gravity G of the turbine 1 is situated about halfway between the flange and the other end of the turbine along the common axis, and is thus axially remote from the flange 20, as shown in FIG. 1. Since the weight of the turbine is large, there result large inertial forces due to accelerations and gyroscopic effects of the turbine, and also to vibration, thereby generating large amounts of torque on the flange. That torque can be sufficiently great to run the risk of breaking the connection via the flange by breaking bolts, or the risk of deforming the thin-walled structure of the turbine.

One way of avoiding the problem posed by that connection consists in using a turbine stator and a generator casing that constitutes a single part. Nevertheless, that loses the benefit of the turbine stator being modular relative to the generator, and the overall axial extent of the generator is longer.

The present invention seeks to remedy those drawbacks.

OBJECTS AND SUMMARY OF THE INVENTION

The invention seeks to provide a device that makes it possible to reduce the stresses and the contact forces to which the flange and the bolts are subjected, while conserving an assembly between the turbine stator and the generator casing that is modular.

This object is achieved by the fact that the fastener device further comprises a second releasable connection between the turbine stator and the gas generator casing that is axially offset from the flange towards the gas generator and that provides second centering of the turbine stator on the casing, the second connection being a sliding joint.

By means of these dispositions, the moment of the inertial forces generated by the movements of the turbine are shared between the second connection and the flange. The axial distance between the second connection and the flange, and the fact that said second connection is further away than the flange from the center of gravity of the turbine stator (since it is closer than the flange to the gas generator) serve to create a mutual engagement lever arm that reduces the stresses on the connection means (e.g. bolts) with the gas generator casing at the flange by spreading the stresses over the entire stator structure. Since the stresses are better distributed, the structure can be lighter. Also, at the second connection, the turbine stator is assembled with the gas generator casing merely by being caused to slide relative thereto. This thus facilitates assembling the stator with the gas generator.

Furthermore, since the second connection is releasable, the modularity of the turbine stator relative to the generator casing is conserved, thus making maintenance of the turbine easier. In addition, the fact that the second connection provides second centering of the turbine stator relative to the gas generator makes it easier to mount the stator on the generator.

Advantageously, the first connection is a connection with mutual engagement.

The flange is configured in such a manner that, at the first connection, the turbine stator is engaged in the gas generator casing. The first connection is thus rigid, thereby enabling the turbine to be well secured on the axis of the gas generator.

The invention also provides a gas turbine engine comprising a gas generator and a free turbine having its casing assembled to the gas generator by a fastener device as defined above.

BRIEF DESCRIPTION OF THE DRAWINGS

The invention can be well understood and its advantages appear better on reading the following detailed description of an embodiment given by way of non-limiting example. The description refers to the accompanying drawings, in which.

MORE DETAILED DESCRIPTION

Figure 1:
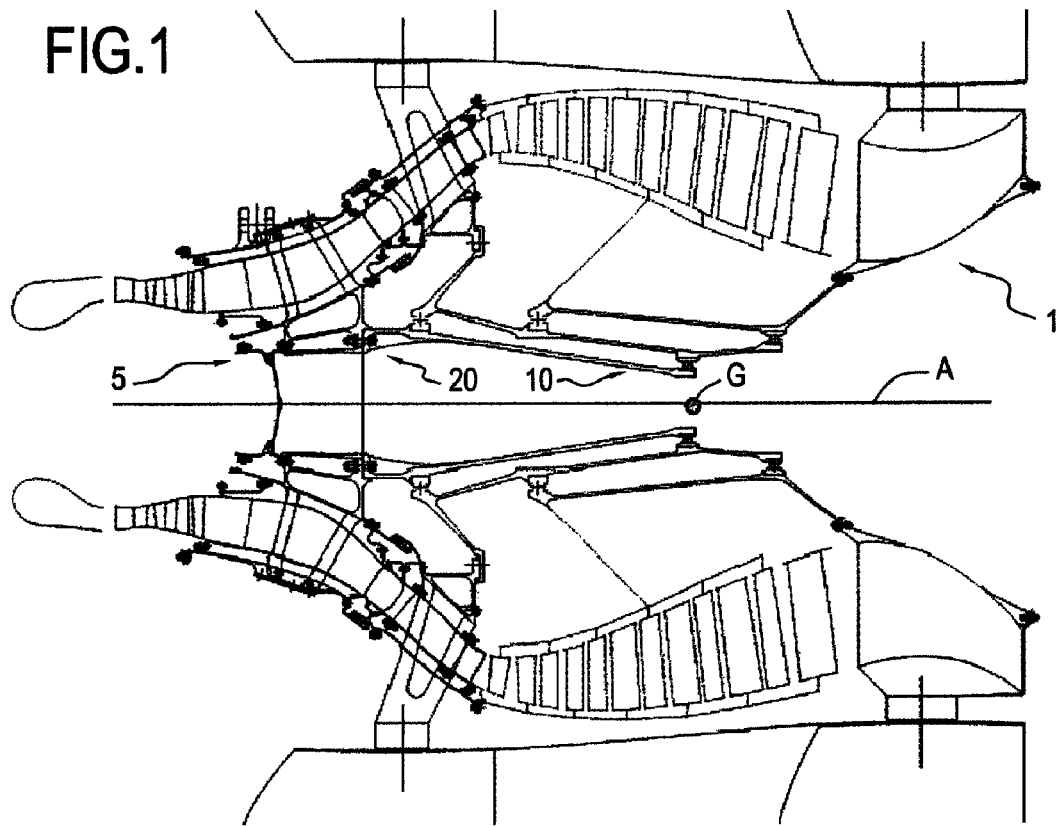
FIG. 1 shows a turbine stator and a gas generator assembled together with a fastener device of the invention.

FIG. 1 shows a casing 5 of a gas generator and a turbine 1 having a stator 10 assembled to the casing 5. In the example shown, the turbine 1 is a turbine of an unducted fan (UDF) engine having two contrarotating propellers. The turbine stator 10 is assembled to the casing 5 of the generator in such a manner that the stator and the casing are in alignment, i.e. their respective axes of symmetry coincide and constitute a common axis A. In the text below, the adjectives upstream and downstream are relative to the direction of gas flow relative to the common axis A, i.e. from left to right in FIG. 1.

Figure 2:
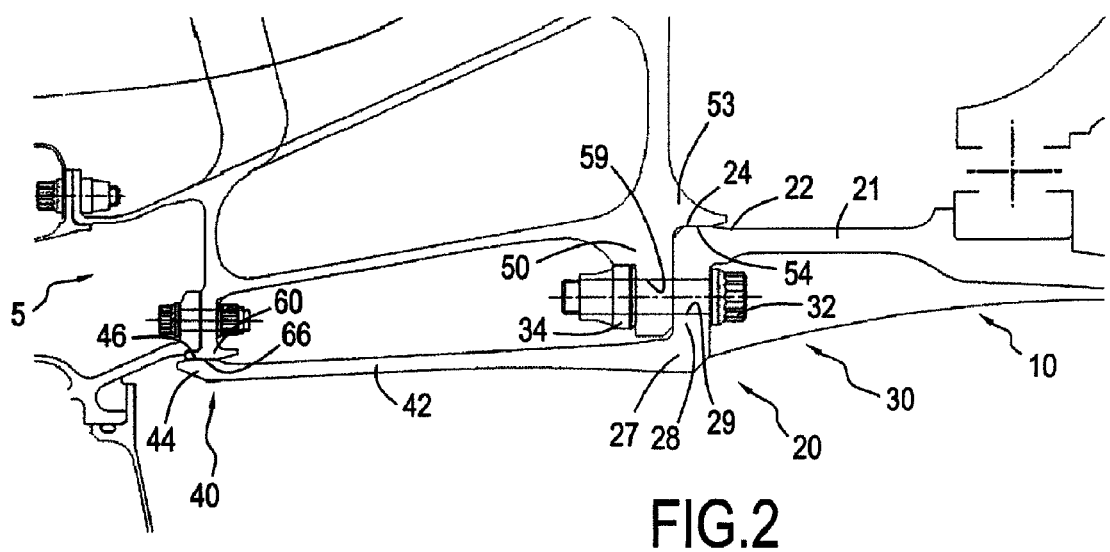
FIG. 2 is a detail view of the FIG. 1 fastener device.

The upstream end of the turbine stator 10 is assembled or fastened to a downstream end of the casing 5 of the gas generator via two connections, shown in FIG. 2. The first connection is described initially.

The first connection comprises a flange 20 that carries a plurality of assembly parts 30 enabling the flange 20 to be fastened to the casing 5. These assembly parts 30 are, for example, nut-and-bolt assemblies including spindle nuts. By way of example they could equally well be stud bolts with nuts. For example they could equally well be bolts with retaining rings and nuts. FIG. 2 shows bolts 32 with spindle nuts 34. The flange 20 has a radially-extending portion 28 that forms an annulus about the common axis A. The radially-extending portion 28 is pierced by first holes 29 parallel to the common axis A and distributed around the circumference of the radially-extending portion 28. The casing 5 has a casing annulus 50 about the common axis A that extends radially towards the common axis A. The casing annulus 50 is pierced by second holes 59 parallel to the common axis A and distributed around the circumference of the casing annulus 50. The upstream face of the radially-extending portion 28 and the downstream face of the casing annulus 50 thus lie in a plane perpendicular to the common axis A. The upstream face of the radially-extending portion 28 bears against the downstream face of the casing annulus 50 in such a manner that the first holes 29 and the second holes 59 come into register with one another. Thus, the bolts 32 are inserted into the first holes 29 and the second holes 59 and are engaged with the spindle nuts 34 so as to hold the radially-extending portion 28 and the casing annulus 50 clamped one against the other, with the upstream face of the radially-extending portion 28 and the downstream face of the casing annulus 50 being in contact. In similar manner, if assembly parts 30 other than screw-and-nut systems were to be used, they would maintain the upstream face of the radially-extending portion 28 in contact with the downstream face of the casing annulus 50. It can thus be understood that the flange 20 prevents the turbine stator 10 from moving axially relative to the generator casing 5. Furthermore, the flange 20 acts by means of the assembly parts 30 to enable the turbine stator 10 to be centered relative to the casing 5.

The flange 20 has an axial portion 21 extending towards the turbine 1 substantially along the common axis A, i.e. to the right in FIG. 2. A portion 24 of the radially-outer surface 22 of the axial portion 21 is in annular contact with the radially-inner surface 54 of an annular projection 53 on the casing annulus 50, this annular projection 53 extending axially towards the turbine stator 10. The portion 24 of the radially-outer surface 22 is adjacent to the upstream face of the radial portion 28 of the flange 20. To enable the stator 10 and the casing 5 to be assembled together, the axial portion 21 of the flange 20 is radially further away from the common axis A than are the first holes 29. Thus, the flange 20 is in contact with the casing 5 both via the upstream face of its radially-extending portion 28, and via a portion 24 of its radially-outer surface 22, thereby providing mutual engagement between the turbine stator 10 and the generator casing 5 at the first connection. In addition, the annular projection 23 contributes to initial centering of the turbine stator 10 on the casing 5.

Figure 3:
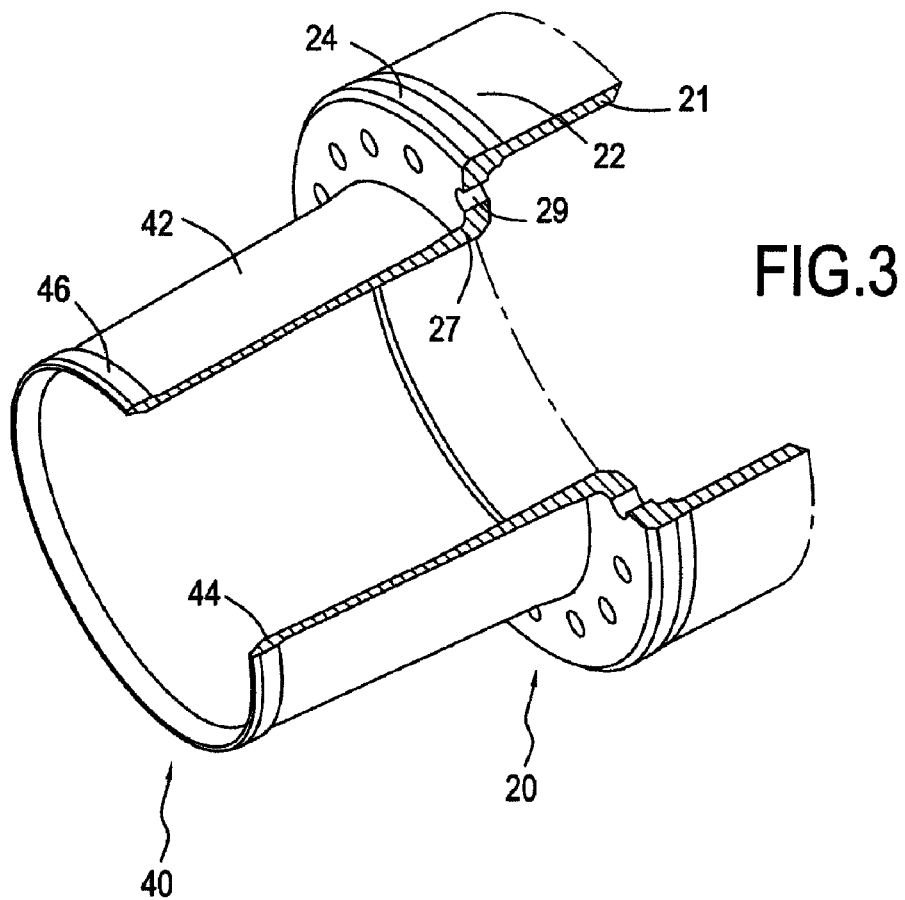
FIG. 3 is a perspective view in section showing the flange and the extender element of the FIG. 2 fastener device.

The second connection is described below. The radially-inner portion 27 of said flange 20, i.e. the portion that is radially inside the radially-extending portion 28, extends axially along the common axis A towards the generator casing 5 (i.e. to the left in FIG. 2) in the form of a extender element 42. The extender element is thus substantially parallel to the common axis A, and is radially closer to the common axis A than are the first holes 29. The extender element 42 is constituted by a cylinder having the common axis A as its axis, as shown in FIGS. 2 and 3.

The extender element 42 has an axial end 44 that is furthest away from the turbine stator 10. The axial end 44 of the extender element 42 is in sliding contact with the gas generator casing 5, the radially-outer structure 46 of the axial end 44 of the extender element 42 being in contact with a radially-inner surface 66 of a portion 60 of the casing 5. The radially-outer surface 46 of the axial end 44 is thus free to slide along the direction of the common axis A relative to said radially-inner surface 66. The axial element 44 and the radially-outer surface 46 are annular, and continuous over the entire length of their circumferences about the common axis A.

Thus, the extender element 42 acts as a mutual-engagement lever arm, with the engagement length being the distance between the axial end 44 and the radially-extending portion 28. The moments of the inertial forces generated by the movements of the turbine stator 10 are thus shared between said second centering and the flange 20, thus enabling deformation energy to be spread over all of the structure of the stator 10 and not solely over the ring of bolts. It should be observed that without the extender element 42, the mutual engagement length would be no more than the length of contact along the common axis A between the flange 20 and the casing 5, i.e. the length along the common axis A of the portion 24 of the radially-outer surface 22 of the flange 20.

Furthermore, the fact that the second connection is in sliding contact in the direction of the common axis A makes it possible to conserve modularity between the turbine stator 10 and the generator casing 5. This also makes it possible to provide second centering of the turbine stator 10 on the casing 5.

Figure 4:
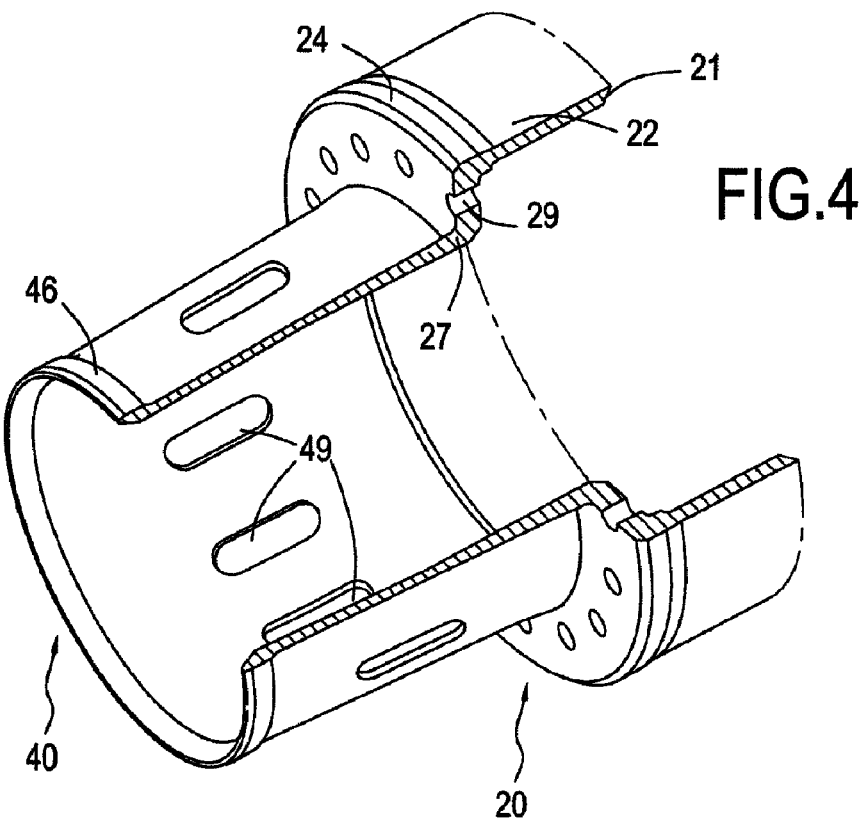
FIG. 4 is a perspective view in section of the flange and the extender element of the fastener device in a variant embodiment of the invention.

In a variant, the extender element 42 may be pierced by oblong holes 49 that are elongate along the common axis A, as shown in FIG. 4. These holes serve both to lighten the structure since the extender element then comprises less material, and they make it easier to pass service connections such as cables, fluid pipes, etc.

The fastener device is described above for the stator of a turbine of a UDF engine. Nevertheless, the fastener device can also apply to other turbines requiring modular assembly on a gas generator.

What is claimed is:

1. A fastener device for fastening a free turbine stator on a gas generator casing that shares a common axis with the turbine stator, the fastener device comprising:
   a flange carrying a plurality of assembly parts providing a first releasable connection between said turbine stator and said gas generator casing, said flange providing first centering of the turbine stator on the gas generator casing; and
   a second releasable connection between said turbine stator and said gas generator casing that is axially offset from the flange towards said gas generator and that provides second centering of said turbine stator on said casing, said second connection being a sliding joint,
   wherein said second connection is constituted by an axial end of an extender element that extends from said flange in an axial direction, and that is in sliding contact with said gas generator casing.

2. A fastener device according to claim 1, wherein said first connection is a connection by mutual engagement.

3. A fastener device according to claim 2, wherein said mutual engagement, first connection is implemented by said flange having a radially-extending portion that is clamped against an annulus of the casing by said assembly part, and
wherein a portion of a radially-outer surface of said flange is in annular contact with a radially-inner surface of an annular projection of said casing annulus that extends axially towards said turbine stator.

4. A fastener device according to claim 1, wherein said extender element extends from a radially-inner portion of said flange.

5. A fastener device according to claim 1, wherein said extender element is a cylinder having said common axis as its axis.

6. A fastener device according to claim 1, wherein said extender element is pierced by oblong holes.

7. A fastener device according to claim 1, wherein said assembly parts are selected from sets constituted by stud bolts with nuts, bolts with spindle nuts, and bolts with retaining rings and nuts.

8. A fastener device for fastening a free turbine stator on a gas generator casing according to claim 1, wherein said stator is a turbine stator of a UDF engine.

9. A gas turbine engine comprising a gas generator and a free turbine having its stator assembled to said gas generator by a fastener device according to claim 1.

10. A fastener device according to claim 1, wherein said flange includes a plurality of holes parallel to the common axis, said plurality of holes being distributed around a circumference of a radially-extending portion of said flange.

11. A fastener device according to claim 10, further comprising a downstream axial portion axially extending from said flange in a downstream direction.

12. A fastener device according to claim 11, wherein the downstream axial portion is radially further away from said common axis than said plurality of holes in said flange.

13. A fastener device according to claim 12, wherein said extender element is radially closer to said common axis than said plurality of holes in said flange.

14. A fastener device according to claim 10, wherein an upstream face of the radially-extending portion abuts a downstream face of the annulus of the casing.

* * * * *